No. 664,942. Patented Jan. 1, 1901.
C. GEORGE.
AIR VALVE.
(Application filed Mar. 15, 1900.)

(No Model.)

Witnesses.

Inventor.
C. George
by Fetherstonhaugh & Co
Attys.

UNITED STATES PATENT OFFICE.

CONRAD GEORGE, OF LISTOWEL, CANADA, ASSIGNOR OF TWO-THIRDS TO JOSEPHUS SNYDER MEYERS AND JOHN ARKELL, OF SAME PLACE.

AIR-VALVE.

SPECIFICATION forming part of Letters Patent No. 664,942, dated January 1, 1901.

Application filed March 15, 1900. Serial No. 8,824. (No model.)

*To all whom it may concern:*

Be it known that I, CONRAD GEORGE, machinist, of the town of Listowel, in the county of Perth, in the Province of Ontario, Canada, have invented certain new and useful Improvements in Air-Valves, of which the following is a specification.

My invention relates to improvements in air-valves more particularly adapted for bicycle-tires; and the object of the invention is to devise a simple form of valve which will always remain perfectly air-tight when closed and yet permit of the tire being pumped with facility; and it consists, essentially, of a casing provided at the inner end with a reverse-shaped cup through an orifice in the center of which extends a stem which is provided at the inner end with a rubber end disk adapted to fit the cup, the outer end being threaded to receive the screw-cap for closing the exterior of the valve, such stem being also encircled by a spiral spring extending between a shoulder at the bottom of the casing and a nut screwed onto the stem at the upper end thereof, the valve being secured in position and otherwise constructed as hereinafter more particularly explained.

Figure 1:
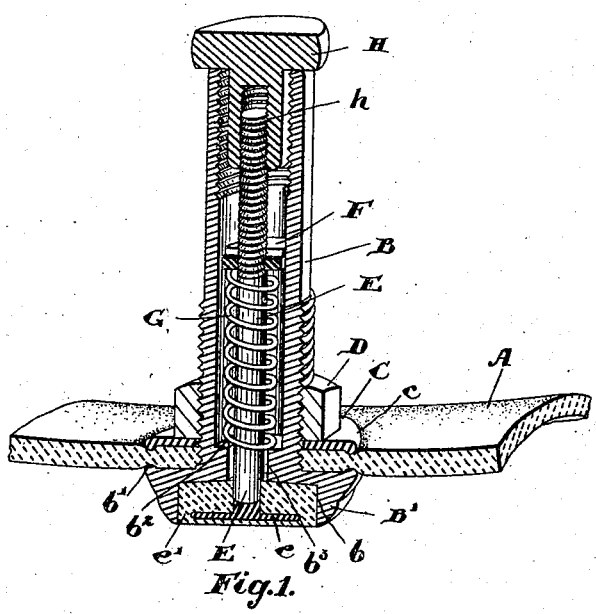
Figure 3:
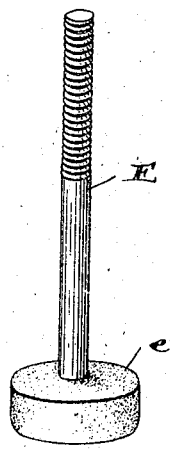
Figure 4:
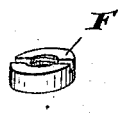
Figure 2:
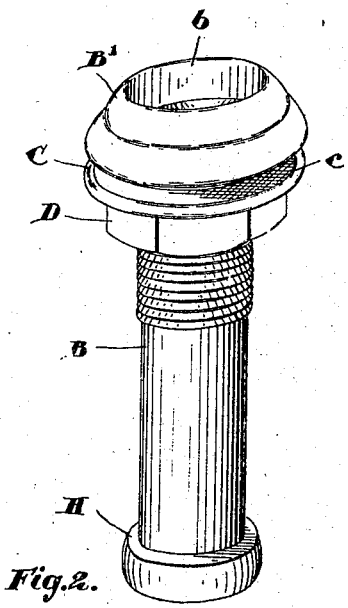

Figure 1 is a sectional perspective view of my improved form of valve. Fig. 2 is an enlarged detail with the valve reversed. Fig. 3 is a detail of the stem and closing-disk. Fig. 4 is a detail of the nut.

In the drawings like letters of reference indicate corresponding parts in each figure.

A is the envelop of a single-tube tire.

B is the valve-casing, which is preferably cylindrical in form and provided with an enlarged end B′, which has a recess or reverse cup $b$ formed therein. The outer edge of the enlarged head is provided with an annular lip $b'$, as shown.

C is a washer also provided with an annular lip $c$, as shown.

The exterior of the casing B outside the end B′ is threaded, as indicated, and has screwed upon it a nut D, which is screwed home upon the washer C, and thereby causes the lips $b'$ and $c$ of the end B′ and washer C, respectively, to indent into the envelop of the tire, and thereby make a perfectly air-tight joint.

E is the stem, which is provided with a disk-shaped end $e$, which has fitted upon it a compressible rubber disk $e'$, which fits the cup $b$ loosely or with an easy fit. It will be noticed that the base of the cup is slightly raised at the center.

F is a nut which is screwed onto the threaded upper end of the stem E and is provided with a cross-slit in order to enable it to be screwed down into position.

G is a spiral spring extending between the nut F and the shoulder $b^2$, encircling the orifice $b^3$, through which the stem E extends.

H is a cap which is provided with the usual flanged and knurled upper end. The cap H is provided with a central threaded hole $h$, so that it may be screwed down upon the stem E, and thereby pull upwardly upon such stem, so as to force the top of the rubber disk $e'$ against the top of the recess or cup and also serve to expand the periphery of the disk against the side of the cup, thereby forming a perfectly air-tight joint.

By removing the cap H the ordinary screw end of the tube of the air-pump may be inserted in position. It will be noticed that the orifice $b^3$ is larger than the stem $e$, so that when the pump is inserted in position the air will pass around the stem. It will also be noticed that the nut F is also of less diameter than the internal diameter of the casing B, so as to allow the air to pass around such nut.

The spring G is a light spring and readily gives to the pressure of the air. As soon as the air is forced in it forces the disk $e'$ from its seat, and as it fits loosely around the interior of the cup when the cap is removed it will be seen that the air will be forced readily through the cup around the disk into the interior of the tire or air-chamber. Immediately the pressure of the air is removed of course such pressure will cause the disk $e'$ to press upon the upper portion of its seat—that is, the base of the cup—and thereby entirely prevent the air from escaping after each pressure is effected.

I may state here that the principal use of the spring G is to hold the disk up and prevent the stem being lost into the interior of the tire should there be no pressure therein.

Such a device as I describe is extremely simple, and it is impossible for the air to escape even during the process of pumping, and much more so when the cap is being screwed home onto the upper threaded end of the valve, so as to tighten up the disk and expand it laterally into the sides of the cup, as well as press up against the top thereof.

Although I describe my air-valve as particularly adapted to tires for bicycles and other wheeled vehicles, it will of course be understood that it may be with equal facility adapted for various uses in which it is desired to confine air under pressure.

What I claim as my invention is—

The combination with the valve-casing having an inner head provided with a recess or cup therein and an orifice leading outwardly therefrom, of the stem provided with a disk-shaped end, the rubber disk fitting within the recess and within which the said disk-shaped end of the stem is embedded at or near the outer or exposed end thereof whereby the upper drawing of the stem compresses the inner side of the disk against the seat and at the same time expands the periphery of the disk circumferentially against the wall of the recess as specified.

CONRAD GEORGE.

Witnesses:
B. BOYD,
H. L. TRIMBLE.